United States Patent [19]
Hart

[11] 3,806,712
[45] Apr. 23, 1974

[54] POLYMERIZATION OF 2-CHLOROBUTADIENE-1,3

[75] Inventor: Bernard A. Hart, Friendswood, Tex.

[73] Assignee: Petro-Tex Chemical Corporation, Houston, Tex.

[22] Filed: Aug. 28, 1972

[21] Appl. No.: 284,096

[52] U.S. Cl.......... 235/151.12, 23/230 A, 23/253 A, 260/95 A, 260/92.3
[51] Int. Cl.......................... G01n 25/42, G06g 7/58
[58] Field of Search...................... 23/230 A, 253 A; 235/151.12; 260/95 A

[56] References Cited
UNITED STATES PATENTS
| | | | |
|---|---|---|---|
| 3,676,653 | 7/1972 | Arens et al. ...................... | 23/230 A |
| 3,078,265 | 2/1963 | Berger et al. .............. | 235/151.12 X |
| 3,351,430 | 11/1967 | Amrehn et al............. | 235/151.12 X |

Primary Examiner—Eugene G. Botz
Attorney, Agent, or Firm—N. Elton Dry

[57] ABSTRACT

A process for polymerizing 2-chlorobutadiene-1,3 in an emulsion system, said process incorporating an improved method of adding a short-stopping agent to the reaction mass to terminate the polymerization at a pre-set degree of conversion of monomer to polymer.

4 Claims, 1 Drawing Figure

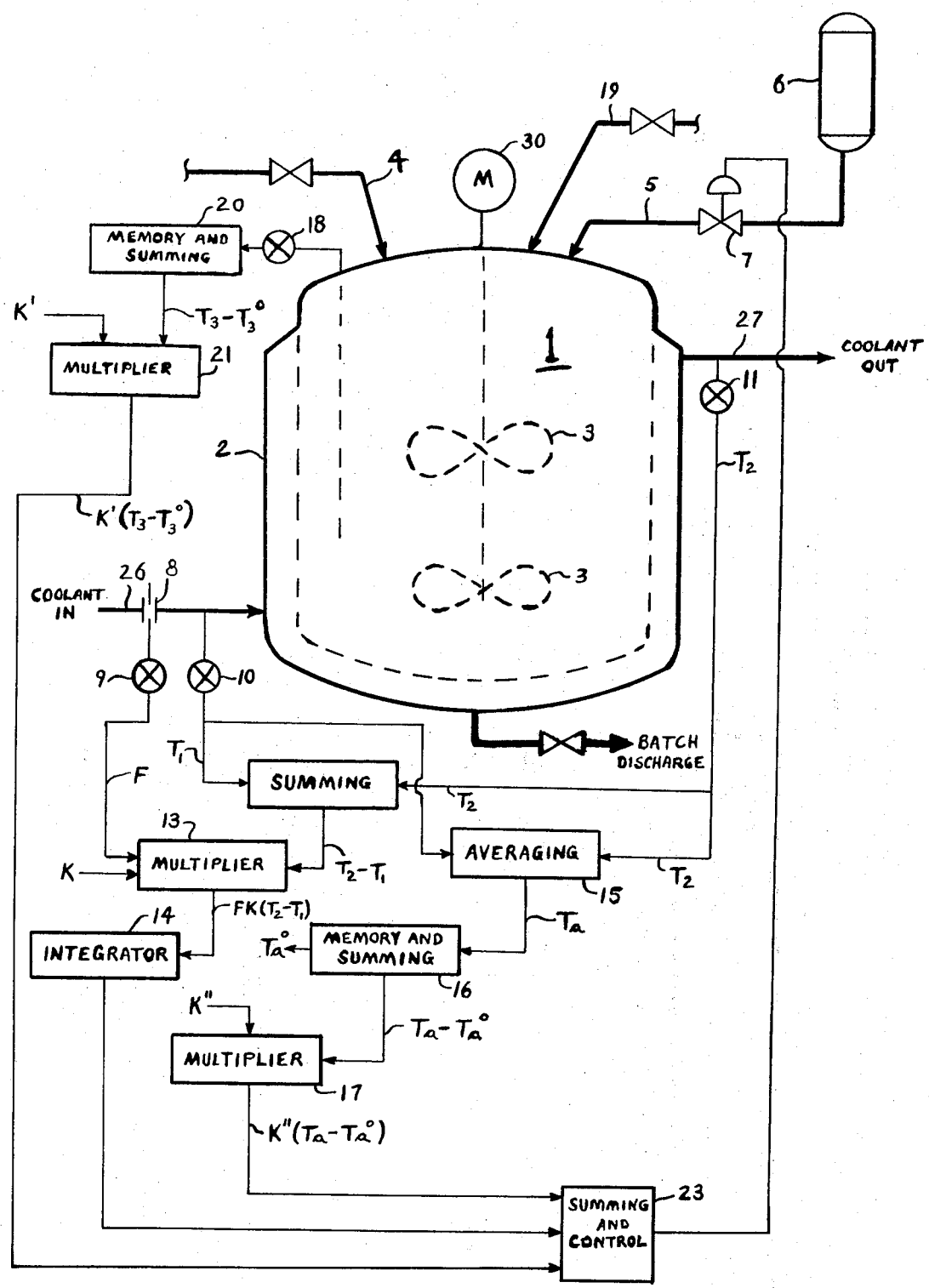

POLYMERIZATION OF 2-CHLOROBUTADIENE-1,3

BACKGROUND OF THE INVENTION

1. Field of the Invention

This invention relates to the control of the reaction for polymerizing 2-chlorobutadiene-1,3 in an emulsion system. In particular, the invention relates to a system for automatically determining when a pre-set degree of completion of the polymerization of the 2-chlorobutadiene-1,3 monomer has been achieved and indicates when a short-stopping agent should be added to the reaction system.

2. Description of the Prior Art

Several methods have been devised for controlling the polymerization of various monomers in the presence of a catalyst. Usually it is desirable to carry out such polymerizations at constant temperatures to obtain uniform products. At the same time, it is desirable to carry out such reactions at substantially constant rates. In many of the applications, the polymerizations are of the continuous type wherein the various reactants and catalysts are being constantly added to the polymerization mass and product is continually being withdrawn. Under such steady state conditions, it has been found that the reaction rate can be controlled by monitoring the rate of heat produced by the exothermic polymerization reaction. In response to the measured heat of reaction, the reactor is controlled in an automatic manner usually by controlling the flow of catalyst or monomer to the polymerization reactor. Examples of such control mechanisms and systems are given in the U. S. Pat. Nos. 3,074,919, 3,078,265, and 2,974,017.

It is also common practice to carry out various polymerization reactions in batch reactors. In order to obtain maximum production of a uniform product, it is usually necessary to control quite accurately both the rate of addition of reactants to the batch reactor as well as the desired termination time of the reaction. U. S. Pat. No. 3,645,697 describes a process for the batch separation of a polymer by solution polymerization wherein the rate of polymerization is held at steady state conditions by measuring the rate of heat produced by the exothermic polymerization reaction. The rate of heat generation is used to automatically control the feed of monomer and catalyst to the batch reactor.

The polymerization of 2-chlorobutadiene-1,3 is accomplished by the batch polymerization of an emulsion of chloroprene monomer in water. The chloroprene monomer is emulsified in water with the aid of a sodium rosin soap and polymerized by an initiator such as potassium peroxydisulfate. The rate of polymerization is not steady during the polymerization reaction but rather, is greatest at the beginning of the reaction period and continually decreases during the reaction. The polymerization is exothermic and the reaction is held at a constant temperature. The progress if the polymerization has generally been followed by the change in specific gravity of the emulsion. Chloroprene polymers having optimum properties are obtained by stopping the reaction short of complete conversion of the monomers present in the reaction mixture. Thus, it has been the practice in controlling the polymerization of 2-chlorobutadiene-1,3 to periodically take specific gravity measurements of the reaction mass and terminate the reaction when the specific gravity reached a desired set point. This procedure requires a great expenditure of time as the measurements must be made at short intervals as the specific gravity approaches the set point to insure that the reaction will be terminated without being allowed to proceed too far. The procedure is further hampered by the fact that the reaction mass is usually quite foamy due to the surface active agents contained therein and the agitation taking place in the reactor. Samples taken for specific gravity measurements must be allowed to settle for a time prior to the actual measurement of the specific gravity to reduce the foam in the sample. This time delay introduces a further limitation in determining the exact time to introduce the short-stopping agent to the reaction mass to terminate the polymerization reaction.

SUMMARY OF THE INVENTION

The invention comprises a control system, apparatus and procedure for controlling the conversion of 2-chlorobutadiene-1,3 to neoprene polymer in a batch, exothermic process. In the batch polymerization of 2-chlorobutadiene-1,3, the desired amount of monomer is weighed and added to the reaction vessel. Rosin soap, water and a stabilizer such as the sodium salt of naphthalene sulfonic acid-formaldehyde condensation product are added to the 2-chlorobutadiene-1,3 and an emulsion thereof produced. The emulsion is brought to a desired temperature such as 40° C and the polymerization reaction is commenced by feeding a free radical initiator type catalyst to the emulsion. The free radical initiator type catalyst is added to the emulsion throughout the reaction period to maintain the polymerization of the 2-chlorobutadiene-1,3. The reaction is exothermic and a coolant such as calcium chloride brine is circulated in contact with the reactor to remove the heat of reaction. The temperature of the polymerization is desirably held constant throughout the reaction period. The rate of reaction is largest at the beginning of the reaction period and slowly decreases throughout the reaction period. Thus, the temperature difference of the brine being supplied to cool the reactor and the brine being withdrawn from the reactor is greatest at the beginning of the reaction and slowly reduces throughout the reaction period.

The present invention provides a reliable control apparatus and procedure by which the polymerization reaction is continuously monitored with respect to the conversion of monomer. The operation of the batch reactor is further controlled to terminate the polymerization reaction at a pre-selected degree of conversion. The polymerization reaction is terminated at the appropriate time as determined by the apparatus and procedure of this invention by the addition of a terminating agent known in the art as a short-stop.

The invention provides apparatus and procedures for automatically determining the conversion of monomer by calculating the total heat liberated by the exothermic reaction. It has been found that the degree of conversion of the 2-chlorobutadiene-1,3 can reliably be measured by a computer system based on the heat of reaction as measured by the heat removed by the circulating coolant and the heat accumulated in the reactor, reaction mass and the jacket surrounding the reactor in which the coolant circulates. The measure of conversion of the present invention has been found to be unaffected by the unsteady state conditions of the batch reactor.

The control system for terminating the polymerization of 2-chlorobutadiene-1,3 in a batch polymerization according to the present invention comprises a reactor and conduit means communicating with said reactor to introduce 2-chlorobutadiene-1,3, catalysts, shortstop and other reactants to the reactor. The reactor has associated therewith heat exchange means for circulating a coolant in heat exchange relationship with the reactor. The temperature of the coolant supplied to and removed from said heat exchanger means and the flow rate of coolant through said heat exchange means are measured with appropriate equipment. Temperature transducers are connected to the temperature measuring equipment to produce signals corresponding to the measured temperatures. A flow transducer is connected to the flow measuring apparatus to produce a signal representative of the measured flow rate. The signals representing the temperatures of the coolant supplied to and removed from the heat exchange means are fed to a differential temperature determining means which delivers a resultant signal representative of the calculated difference between the temperature of the coolant supplied to the heat exchange means and the coolant removed from the heat exchange means. The signal representing the difference in temperatures is fed along with the signal representative of the measured flow rate of coolant through the heat exchange means to a multiplying element which multiplies the two signals together and then multiplies the product of these signals with a constant representative of the specific heat of the coolant material. The multiplying element delivers a signal representing the instantaneous removal of heat from the reactor by the coolant. The signal from the multiplying element is fed to an integrating element which produces a signal representing the accumulated heat of reaction removed by the circulating coolant. The temperature of the reaction mass in the reactor is obtained and a signal representative of this temperature is produced by a transducer connected to the temperature measuring means. This signal is fed to a memory and summing element. The memory and summing element receives and holds the value of the signal corresponding to the temperature of the reactor at the start of said batch polymerization and determines the difference between the instantaneous value of the temperature of the reaction mixture and the temperature of the reaction mixture at the start of the batch polymerization. The memory and summing element delivers a signal representative of the difference between the instantaneous value of the temperature of the reaction mass and the temperature of the reaction mass at the start of the batch polymerization to a second multiplying element which multiplies the signal from the memory and summing element with a constant representative of the specific heat and mass of the reactor and contents therein. This signal provides a continuous value for the amount of heat absorbed by the reactor and reaction mixture. The signals representative of the temperatures of the coolant supplied and withdrawn from the heat exchange means are fed to a summing and dividing element which adds the signals representative of the temperatures of the coolant supplied and withdrawn from the heat exchange means and divides the sum by 2. The summing and dividing element thus produces a signal representative of the average temperature of the coolant being supplied and withdrawn from the heat exchange means. The signal representing the average temperature is fed to a second memory and summing element which holds and records the value of the signal of the average temperature corresponding to the temperatures of the coolant at the start of the batch polymerization and further determines the difference between the instantaneous value of the average temperature and the average temperature corresponding to the temperatures at the start of said batch polymerization. The second memory and summing element thus delivers a continuous signal representing the average temperature change of the coolant throughout the reaction period. The signal representing the average change of temperature in the coolant has been found to equally represent the average change of temperature of the heat exchange means, i.e., the jacket surrounding the reactor, over the reaction period and is thus used to determine the heat taken up by the heat exchange means. The signal representing the average change of temperature is fed to a third multiplying element which multiplies the average temperature with a constant representative of the specific heat and mass of the heat exchange means. The signal obtained from the third multiplying element thus represents the heat abosrbed by the heat exchange means or jacket surrounding the reactor which contains the coolant material. A summing element is provided which receives the signals representative of the heat of reaction absorbed by the coolant, the heat of reaction absorbed by the reactor and reaction mass and the heat of reaction absorbed by the heat exchange means. The summing element delivers a continuous measurement which has been found can accurately be used to determine the conversion of monomer in the reaction mass. The polymerization reaction can be terminated at any desired conversion by adding the shortstop agent when the polymerization reaction has proceeded to a preselected degree of completion as measured by the output signal of the control apparatus.

Accordingly, the present invention provides a control system which is capable of automatically determining the conversion at any time during the reaction and which can be used to control the addition of a shortstopping agent to terminate the polymerization reaction at any pre-selected degree of conversion. The control apparatus of the present invention has been found to provide a continuous output signal which is fully representative of the conversion of monomeric 2-chlorobutadiene-1,3 to neoprene polymer without being adversely affected by the unsteady state nature of the batch polymerization process.

BRIEF DESCRIPTION OF THE DRAWING

The accompanying drawing is a schematic representation of the control system of this invention.

DETAILED DESCRIPTION OF THE INVENTION

The invention comprises a process for the batch polymerization of 2-chlorobutadiene-1,3 to 2-chlorobutadiene polymer commonly called neoprene. To produce neoprene having optimum properties, the polymerization reaction is terminated, or as is termed in the art "shortstopped," prior to complete conversion of the 2-chlorobutadiene-1,3 monomer. This procedure requires the addition of a shortstop agent to the reaction mass at a critical time during the polymerization reaction. The present invention comprises a process, system and apparatus whereby the conversion of the 2-chlorobutadiene-1,3 monomer is instantaneously and continuously determined in an automatic manner and controls the addition of the shortstop agent to the reaction mass at an exact pre-selected degree of conversion.

The polymerization of 2-chlorobutadiene-1,3 is exothermic releasing 21.1 ± 1.6 kilocalories per mole of 2-chlorobutadiene-1,3 monomer being converted to neoprene polymer. According to the present invention, a computer system utilizing three easily obtainable temperature measurements and one flow measurement has been found to indicate in a continuous and instantaneous manner, a reliable figure representative of the heat of reaction removed from the polymerization reactor and which can thus be directly calibrated to accurately indicate in a continuous and instantaneous manner the degree of conversion of the 2-chlorobutadiene-1,3 monomer at any instant during the polymerization period. The instantaneous indication of conversion obtained by the present invention has been found to be essentially unaffected by the unsteady state conditions occurring in the batch polymerization reactor. The instantaneous indication of conversion of monomer in the reaction mass is used to determine the exact time during the reaction period when to add the shortstopping agent to the reaction mass. The indication of conversion obtained by the present invention is instantaneous and there is no time lag incurred between obtaining the measurement and the addition of shortstop agent. Thus, the shortstop agent is added to the exact conversion in each batch of polymer produced and the polymer has improved homogeniety from batch to batch.

The invention will be described in further detail with reference to the accompanying drawing. Referring to the drawing, there is shown a reactor 1 which is provided with a jacket 2 through which a coolant or heat exchange medium can be circulated. The coolant is supplied to jacket 2 through line 26 and withdrawn from jacket 2 by line 27. Reactor 1 is provided with agitation means such as stirrer 3 and motor 40. The reactor is also provided with a conduit 4 through which the reaction medium comprising 2-chlorobutadiene-1,3 can be introduced to reactor 1. After a predetermined quantity of 2-chlorobutadiene-1,3 has been added to reactor 1 as an emulsion in water, the polymerization reaction is commenced by feeding a free initiator type catalyst to the reaction mass through conduit 19. The computer control apparatus described hereinafter commences operation at the time when the catalyst is first introduced to the reactor. The temperature of the reaction is maintained at approximately 40° C by apparatus not shown in the drawing which controls the flow of catalyst to the reaction mass and the flow of coolant in and out of jacket 2.

A temperature sensing element is positioned within reactor 1 to measure the temperature of the reaction medium. This sensing element is connected to a transducer 18 which transmits a signal $T_3$ representative of the measured temperature to a memory and summing element 20. The memory and summing element 20 retains in memory the output signal $T_3°$ corresponding to the temperature of the reaction at the initiation of the reaction and further produces a continuous output signal equal to the instantaneous value of the signal $T_3$ minus the signal of $T_3°$. The signal $T_3$ minus $T_3°$ is representative of the difference between the instantaneous temperature of the reaction medium and the initial temperature of the reaction medium. The signal $T_3 - T_3°$ is continuously fed to multiplier 21. A constant $K^1$ is also fed to multiplier 21 and an output signal is produced by multiplier 21 representative of the multiple $K^1 (T_3 - T_3°)$. The constant $K^1$ is representative of the specific heat and mass of the reaction medium and the reactor. The constant $K^1$ is easily determined by multiplying the specific heat of the reaction medium times the mass of the reaction medium and adding the product thereof to the product of the specific heat of the reactor and the mass of the reactor. The output signal $K^1 (T_3 - T_3°)$ from multiplier 21 represent the heat absorbed by the reaction medium and the reactor during the elapsed portion of the reaction.

A temperature sensing element is positioned within conduit 26 and measures the temperature of the coolant being introduced to jacket 2. This sensing element is connected to a transducer 10 which transmits a signal representative of the measured temperature $T_1$ to summing unit 12. The Signal $T_1$ is also sent to an averaging element 15. The function of the averaging element will be discussed later. Another temperature sensing element is positioned within conduit 27 to measure the temperature of the coolant being withdrawn from jacket 2. This sensing element is connected to a transducer 11 which transmits a signal $T_2$ representing the measured temperature to summing unit 12. Signal $T_2$ is also sent to averaging unit 15. The summing unit 12 subtracts signal $T_1$ from signal $T_2$ and delivers a signal $T_2 - T_1$ representative of the difference in the temperature of the coolant being supplied to jacket 2 and the coolant being withdrawn from jacket 2. The signal $T_2 - T_1$ is forwarded to a multiplier unit 13. A flow measuring device 8 is situated in conduit 26 to measure the flow of coolant to jacket 2. The flow sensing element is connected to a transducer 9 which transmits a signal representative of the measured flow rate F to multiplier 13. A constant signal K is also fed to multiplier 13. A resultant signal $FK (T_2 - T_1)$ from multiplier 13 is forwarded to integrator unit 14. The signal $FK (T_2 - T_1)$ represents the instantaneous heat being removed from the reaction mechanism by the circulating coolant. The integrator unit 14 produces a signal representative of the accumulated heat removed by the coolant and transmits this signal to summing and control unit 23. The constant K represents the specific heat of the particular coolant being used.

As mentioned hereinbefore, signals $T_1$ and $T_2$ are forwarded from transducers 10 and 11 respectively to averaging unit 15. The averaging unit adds signal $T_1$ to signal $T_2$ and divides the sum thereof by 2. A resultant signal $Ta$ representing the average temperature of the coolant in jacket 2 is forwarded to memory and summing unit 16. In a preferred embodiment of the present invention, it has been found that using a weighted average of the temperatures $T_1$ and $T_2$ is sometimes desirable. When a weighted average is being used, the averaging unit 15 receives signals $T_1$ and $T_2$ and then first divides $T_1$ by 2 and $T_2$ by 0.666, the quotients are then added and the sum divided by 2 thereby delivering the weighted or modified signal $Ta$. In either mode of operation, the signal $Ta$ is forwarded to a memory and summing unit 16. The memory and summing unit 16 records and places in memory the value of the signal from the averaging unit 15 corresponding to the temperatures of the coolant being supplied and withdrawn from jacket 2 at the start of the reaction or polymerization period. The signal corresponding to the average temperature of the coolant at the beginning of the polymerization reaction is shown as signal $Ta°$. The memory and summing unit 16 also continuously subtracts the value of the signal $Ta°$ from the instantaneous signal being received from averaging unit 15 to produce an output signal $Ta - Ta°$ which is representative of the change in the average temperature of jacket 2 during the elapsed portion of the polymerization reaction period. The signal $Ta - Ta°$ is forwarded to multiplier unit 17. A signal representing a constant $K^{11}$ is also introduced to multiplier 17 and a resultant signal $K^{11} (Ta - Ta°)$ representative of the heat accumulated in jacket 2 is produced and forwarded on to summing and control unit 23.

The three signals from multiplier 21, integrator 14 and multiplier 17 are summed by summing and control unit 23 to produce an output signal representative of the total heat removed from the reactor. When the total heat reaches a pre-set value corresponding to the desired conversion of 2-chlorobutadiene-1,3 in the reactor, a signal is generated to open valve 7 in conduit 5 and thus transfers the shortstopping agent from vessel 6 into the reactor 1. The output signal from summing and control unit 23 can also be fed to an appropriate recording unit not shown in the diagram which prepares a visible record of the conversion of monomer in the reactor. The amount of catalyst being introduced into reactor 1 during the reaction period can be controlled by comparing the status of the actual conversion at specific elapsed times to the desired conversion for the specific elapsed time.

After the reaction mass has been treated with the shortstopping agent and the polymerization reaction thus terminated, the contents of the reactor are removed through outlet conduit 25.

As a specific example of the process of this invention, 16,400 lbs of 2-chlorobutadiene-1,3 was emulsified with 16,400 lbs of water, 500 lbs of disproportionated wood rosin, 115 lbs of the sodium salt of the condensation product of formaldehyde in naphthalene sulfonic acid, 74 lbs of 100 percent sodium hydroxide and 37 lbs of 100 percent $n$-dodecyl mercaptan and charged into reactor 1. The emulsion was at an initial temperature of about 38° C. The polymerization reaction was initiated by feeding an aqueous solution of 0.35 percent potassium persulfate, 0.07 percent silver salt and 1.00 percent isopropyl alcohol to the reaction mixture. The aqueous solution of potassium persulfate, silver salt, and isopropyl alcohol was fed as required to the reactor during the reaction to maintain the polymerization. The polymerization was carried out under a nitrogen blanket and the temperature of the reaction medium was maintained at approximately 40° C. When the signal from the summing and control unit 23 indicated that 3,822 kilocalories of heat had been removed from the reaction medium, the reaction was shortstopped with an emulsion containing 0.01 parts $t$-butylcatechol, 0.01 parts phenothiazine, 0.2 parts di- and/or mono-octyldiphenylamine, 0.02 parts sodium dodecyl benzene sulfonate and 0.8 parts water. The shortstopping agent was added to the reactor through conduit 5. After the polymerization reaction had been terminated the batch was withdrawn from the reactor through conduit 25. Analysis of the product indicated that the percent conversion of chloroprene monomer to polymer was approximately 70 percent, the desired conversion.

In the polymerization of neoprene, one or more emulsifiers is included in the reaction medium. Such emulsifiers are the salts of the condensation product of naphthalene sulfonic acid and formaldehyde (such as disclosed in U.S. Pat. Nos. 2,046,757 and 2,264,173), the alkali metal salts of sulfated and/or sulfonated maleic acid, the salts of rosins, and rosin derivatives such as wood rosin, disproportionated rosin or hydrogenated rosin, the ammonium, sodium or potassium salts of long chain fatty acids and non-ionic surface active agents such as the ethylene oxide or propylene oxide condensation products. Additional emulsifying agents are disclosed in U. S. Pat. No. 2,264,173.

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or the inorganic type. Examples of organic peroxides are benzoyl peroxide, cumene hydroperoxide, tertiary-butyl isopropylbenzene hydroperoxide, azo catalysts such as alpha-alpha$^1$-azo-bis-isobutyronitrile and the like. Suitable inorganic peroxides are such as inorganic per acids including per sulfates, per borates, or per carbonates, e.g., ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The usual modifiers or other agents used in the polymerization of neoprene may be present in the emulsion. For instance, the polymerization may be carried out in the presence of sulphur to produce a sulphur modified neoprene. Also, chain transfer agents may be employed such as the alkyl mercaptans that, e.g., dodecyl mercaptan, iodoform, benzyl, iodide and dialkyl xanthogen disulfides such as diisopropyl xanthogen disulfide. Water soluble iron salts such as ferrous sulfate or iron chelates may also be employed.

The degree of polymerization, i.e., the conversion of monomer to polymer, suitable ranges from between 60 and 90 percent conversion. The temperature of polymerization may be varied depending upon the particular type of polymer being produced with suitable ranges being from 0° to 90° C with the preferred range being between 15° C and 55° C.

The polymerization is shortstopped by the addition of agents such as para-tertiary-butyl catechol and thiodiphenylamine.

In an embodiment not shwon in the drawing, the control mechanism can be modified slightly to correct for variation with temperature in specific heat, viscosity and density for the coolant and the reaction medium, by correcting the constants K and K''. These constants can be corrected by feeding the signals representative for the constants and the temperature of the respective liquid, i.e., the coolant or reaction medium to a computer unit which is programmed to correct the signal representative of the constant according to the temperature. The corrected signals are then forwarded to multiplier units 13 and 17.

What is claimed is:

1. In a batch process for the conversion of 2-chlorobutadiene-1,3, monomer to 2-chlorobutadiene polymer comprising charging an aqueous emulsion of 2-chlorobutadiene-1,3 to a reactor, adding a free radical initiator type catalyst to said emulsion contained in said reactor during the reaction period to maintain the polymerization of said 2-chlorobutadiene-1,3 circulating a coolant in heat exchange means being in thermal contact with said reactor to remove exothermic heat of reaction and adding a reaction terminating agent to said reactor to terminate said polymerization after a desired conversion of said 2-chlorobutadiene-1,3 monomer to 2-chlorobutadiene polymer has been obtained, an improved method of determining when said desired conversion of said 2-chlorobutadiene-1,3 monomer to 2-chlorobutadiene polymer has been obtained, said improved method comprising:

continuously measuring the temperature in the reactor and of the coolant supplied to and removed from said heat exchange means;

continuously measuring the flow rate of coolant passed through said heat exchange means;

producing electrical signals being representative of each of said temperatures and flow rate;

feeding said signals corresponding to said temperatures of the coolant supplied to and removed from said heat exchange means and said flow rate of coolant passed through said heat exchange means and a signal representative of the specific heat of said coolant to a summing and multiplying means to produce an output signal $S_1$ representative of said difference between the temperatures of the coolant multiplied by said flow rate and said specific heat of said coolant;

feeding said output signal $S_1$ to an integrating element to produce a continuous signal $S_2$ representative of the total heat removed from said heat exchange means by said coolant;

feeding said signal corresponding to the temperature in said reactor to a memory and summing means which records and holds the value of said signal corresponding to the temperature in said reactor at the start of said batch polymerization and continuously produces an output signal $S_3$ representative of the difference between the instantaneous value of said temperature in said reactor and the temperature in said reactor at the start of said batch polymerization;

feeding said output signal $S_3$ and a signal representative of the specific heat of the reactor to a multiplying means to produce a continuous output signal $S_4$ representative of the product of said specific heat and said output signal $S_3$;

feeding a second set of signals corresponding to said temperatures of the coolant supplied to and removed from said heat exchange means to a summing and dividing means to produce a continuous output signal $S_5$ representative of the difference between said temperatures of the coolant supplied to and removed from said heat exchange means divided by 2.

feeding said output signal $S_5$ from said summing and dividing means to a second memory and summing means which records and holds the value of said signal $S_5$ corresponding to temperatures at the start of said batch polymerization, and continuously produces an output signal $S_6$ representative of the difference between the instantaneous value of signal $S_5$ and the value of signal $S_5$ at the start of said batch polymerization;

feeding said output signal $S_6$ from said second memory and summing means and a signal representative of the specific heat of the heat exchanger means to a second multiply means to produce a continuous output signal $S_7$ representative of the product of said specific heat of said heat exchange means and said output signal $S_6$;

feeding said output signals $S_2$, $S_4$, and $S_7$ to a summing means to produce an output signal $S_8$ representative of the summation of said signals $S_2$, $S_4$, and $S_7$;

feeding said output signal $S_8$ from said summing means to a control means to control the termination of said polymerization reactions in said reactor by indicating when to add said terminating agent to said reactor, said addition of said terminating agent being added to said reactor when a pre-selected degree of completion of said reaction has been obtained as measured by said output signal $S_8$ from said summing means.

2. A batch process for the conversion of 2-chlorobutadiene-1,3 monomer to 2-chlorobutadiene polymer as claimed in claim 1 wherein said summing and dividing means produces a modified output signal $S_5$ obtained by (1) dividing the signal corresponding to the temperature of the coolant supplied to said heat exchange medium 2, (2) dividing the signal corresponding to the temperature of the coolant removed from said heat exchange means by 0.666, (3) adding the quotients obtained in steps (1) and (2) and dividing the sum thereof by 2.

3. A control system for terminating the polymerization reaction in the batch polymerization of 2-chlorobutadiene-1,3, comprising:

a reactor and conduit means communicating with said reactor to introduce 2-chlorobutadiene-1,3 catalyst and shortstop to said reactor, heat exchange means for circulating a coolant in heat exchange relationship with said reactor;

first and second temperature sensing means to measure respectively the temperatures of the coolant supplied to and removed from said heat exchange means;

mans to measure the flow rate of coolant passed through said heat exchange means;

first and second temperature transducers connected respectively to the first and second temperature sensing means to produce signals $T_1$ and $T_2$ respectively;

a differential temperature determining means for receiving signals $T_1$ and $T_2$, calculating the difference between said signals and delivering a resultant signal ($\Delta T$) representative of said calculated difference;

a flow transducer connected to the flow measuring element for delivering a signal (F) representative of the measured flow rate;

multiplying element having a set point K, said multiplying element connected to the differential temperature transducer and the flow transducer for receiving signals ($\Delta T$) and (F), multiplying the signals ($\Delta T$) and (F), multiplying the product of the signals ($\Delta T$) and (F) with the set point K and delivering a signal KF$\Delta T$ responsive to said multiplications;

an integrating element connected to the multiplying element for receiving and integrating the signal K(F) ($\Delta T$), and delivering a signal $\Sigma$K(F) ($\Delta T$) representative of said integration;

third temperature sensing means to measure the temperature of the reaction medium in the reactor;

a third temperature transducer connected to the third temperature sensing means for delivering a signal $T_3$ representative of the measured temperature;

a memory and summing element connected to the third temperature transducer for receiving said signal $T_3$, recording and holding the value of signal $T_3°$ corresponding to the temperature of the reactor at the start of said batch polymerization, determining the difference between the instantaneous value of $T_3$ and $T_3°$ and delivering a signal ($T_3 - T_3°$) representative of the difference between the instantaneous value of $T_3$ and $T_3°$;

a second multiplying element having a set point $K^1$, said second multiplying element connected to the memory and summing element for receiving signal ($T_3 - T_3°$), multiplying signal ($T_3 - T_3°$) with $K^1$ and delivering a signal $K^1 \Delta T^1$ responsive to said multiplication;

a summing and dividing element connected to said first and second temperature transducers for receiving signals $T_1$ and $T_2$, adding the signals $T_1$ and $T_2$ and dividing the sum by 2, and delivering a signal $Ta$;

a second memory and summing element connected to the summing and dividing element for receiving signal $Ta$, recording and holding the value of signal $Ta°$ corresponding to the temperatures $T_1$ and $T_2$ at the start of said batch polymerization, determining the difference between the instantaneous value of $Ta$ and $Ta°$ and delivering a signal $\Delta T^{11}$ representative of said difference between $Ta$ and $Ta°$;

a third multiplying element having set point $K^{11}$, said third multiplying element connected to the second memory and summing element for receiving signal $\Delta T^{11}$, multiplying signal $\Delta T^{11}$ with $K^{11}$ and delivering a signal $K^{11} \Delta T^{11}$ responsive to said multiplication;

a summing element connected to said integrating element, said second multiplying element ane said third multiplying element for receiving signals $\Sigma KF\Delta T$, $K^1 \Delta T^1$ and $K^{11}$ therefrom respectively, adding signals $\Sigma KF\Delta T$, $K^1 \Delta T^1$ and $K^{11} \Delta T^{11}$ and delivering an output signal representative of the summation of signals $\Sigma KF\Delta T$, $K^1 \Delta T^1$, $K^{11} \Delta T^{11}$;

means responsive to said output signal to control the operation of said batch reactor to terminate said polymerization reaction therein when the reaction has proceeded to a pre-selected degree of completion as measured by said output signal, wherein K is a constant representative of the specific heat of said coolant, $K^1$ is a constant representative of te specific heat of the reactor and $K^{11}$ is a constant representative of the specific heat of the heat exchanger means.

4. A control system as claimed in claim 3 wherein the summing and dividing element connected to said first and second temperature transducers for receiving signals $T_1$ and $T_2$ first divides $T_1$ by 2 and $T_2$ by 0.666, adding the quotients and dividing the sum by 2 thereby delivering a modified signal $Ta$ which is forwarded to said second memory and summing element.

* * * * *

PO-1050
(5/69)

UNITED STATES PATENT OFFICE
CERTIFICATE OF CORRECTION

Patent No. 3,806,712  Dated April 23, 1974

Inventor(s) Bernard A. Hart

It is certified that error appears in the above-identified patent and that said Letters Patent are hereby corrected as shown below:

Col. 1, line 59 reads "progress if" but should read --- progress of ---.
Col. 5, line 30 reads "to the exact" but should read --- at the exact ---.
Col. 9, line 67 reads "by 2." but should read --- by 2; ---.
Col. 10, line 37 reads "medium 2," but should read --- medium by 2, ---.
Col. 10, line 47 reads "reactor," but should read --- reactor; ---.
Col. 10, line 54 reads "mans to measure" but should read --- means to measure ---.
Col. 11, line 1 reads "multiplying agent" but should read --- a multiplying element ---.
Col. 12, line 16 reads "ane" but should read --- and ---.
Col. 12, line 29 reads "of te specific" but should read --- of the specific ---.

Signed and sealed this 13th day of May 1975.

(SEAL)
Attest:

RUTH C. MASON
Attesting Officer

C. MARSHALL DANN
Commissioner of Patents
and Trademarks